(12) United States Patent
Wu et al.

(10) Patent No.: US 11,261,094 B2
(45) Date of Patent: Mar. 1, 2022

(54) METHOD FOR MANUFACTURING NANO-CARBON MICROPARTICLE

(71) Applicants: Peng Wu, Zhejiang (CN); Yanting Cai, Zhejiang (CN)

(72) Inventors: Peng Wu, Zhejiang (CN); Yanting Cai, Zhejiang (CN)

( * ) Notice: Subject to any disclaimer, the term of this patent is extended or adjusted under 35 U.S.C. 154(b) by 0 days.

(21) Appl. No.: 16/614,875

(22) PCT Filed: Apr. 25, 2018

(86) PCT No.: PCT/CN2018/084495
§ 371 (c)(1),
(2) Date: Nov. 19, 2019

(87) PCT Pub. No.: WO2019/174109
PCT Pub. Date: Sep. 19, 2019

(65) Prior Publication Data
US 2021/0155485 A1    May 27, 2021

(30) Foreign Application Priority Data
Mar. 16, 2018    (CN) .......................... 201810218716.7

(51) Int. Cl.
*C01B 32/90*    (2017.01)
*C01B 32/15*    (2017.01)

(52) U.S. Cl.
CPC .............. *C01B 32/90* (2017.08); *C01B 32/15* (2017.08); *C01P 2004/01* (2013.01); *C01P 2004/62* (2013.01); *C01P 2004/64* (2013.01)

(58) Field of Classification Search
CPC ......... B82Y 40/00; C01B 32/05; C01B 32/15; C01B 32/90; C01P 2004/01; C01P 2004/62; C01P 2004/64
See application file for complete search history.

(56) References Cited

U.S. PATENT DOCUMENTS

2016/0272502 A1    9/2016    Zhu et al.

FOREIGN PATENT DOCUMENTS

| CN | 1587077 | 3/2005 |
|---|---|---|
| CN | 101910060 | 12/2010 |

(Continued)

OTHER PUBLICATIONS

Kim, Jin-Myung, et al. "Effect of carbonization temperature and chemical pre-treatment on the thermal change and fiber morphology of kenaf-based carbon fibers." Carbon letters 12.3 (2011): 131-137.*
Shamsuddin, M. S., N. R. N. Yusoff, and M. A. Sulaiman. "Synthesis and characterization of activated carbon produced from kenaf core fiber using H3PO4 activation." Procedia Chemistry 19 (2016): 558-565.*
International Search Report, issued in the corresponding PCT application No. PCT/CN2018/084495, dated Dec. 28, 2018, 7 pages.

(Continued)

*Primary Examiner* — Richard M Rump
(74) *Attorney, Agent, or Firm* — Hamre, Schumann, Mueller & Larson, P.C.

(57) ABSTRACT

The invention provides a method for manufacturing nano carbon micro particles, including the following steps: step one: digesting the Malvaceae plants to produce solutions containing lignin; step two: extracting lignin condensation from the solution containing lignin, and then removing salt from the lignin condensation to form material containing lignin; step three: carbonizing the material containing lignin to form carbides; step four: crushing the carbides; step five: performing high-frequency heat treatment on the crushed carbides to obtain carbon micro particles; further including step six: crushing again the carbon micro particles so that the carbon micro particles are nano-sized and finely pulverized. The high-purity carbon micro particles obtained by the present invention have excellent properties in aspects of conductivity, wear resistance, heat resistance, corrosion resistance, etc., which can be used as an electromagnetic sealing material, a wear-resistant material, a heating ele- (Continued)

ment, a heat-resistant material, corrosion resistant materials, the application is extremely wide.

4 Claims, 1 Drawing Sheet

(56) References Cited

FOREIGN PATENT DOCUMENTS

| CN | 102464802 | 5/2012 |
|---|---|---|
| CN | 102910613 | 2/2013 |
| CN | 105555793 | 5/2016 |
| CN | 105819426 | 8/2016 |
| CN | 106366330 | 2/2017 |
| CN | 107364842 | 11/2017 |
| CN | 107628618 | 1/2018 |
| CN | 107735431 | 2/2018 |
| DE | 102016202458 | 8/2017 |
| JP | 2005289666 A * | 3/2004 |
| JP | 2016023115 A * | 2/2016 |

OTHER PUBLICATIONS

Xu et al., "Study on Active Carbon made from Lignin separated from Kraft Mill Black Liquor", Journal of Sichuan Agricultural University, vol. 17, No. 3, Sep. 30, 1999, 4 pages, (including English abstract).

First Chinese Office Action, issued in the corresponding Chinese patent application No. 201810218716.7, dated Apr. 1, 2019, 10 pages (English Translation provided).

Second Chinese Office Action, issued in the corresponding Chinese patent application No. 201810218716.7, dated Sep. 9, 2019, 11 pages (English Translation provided).

* cited by examiner

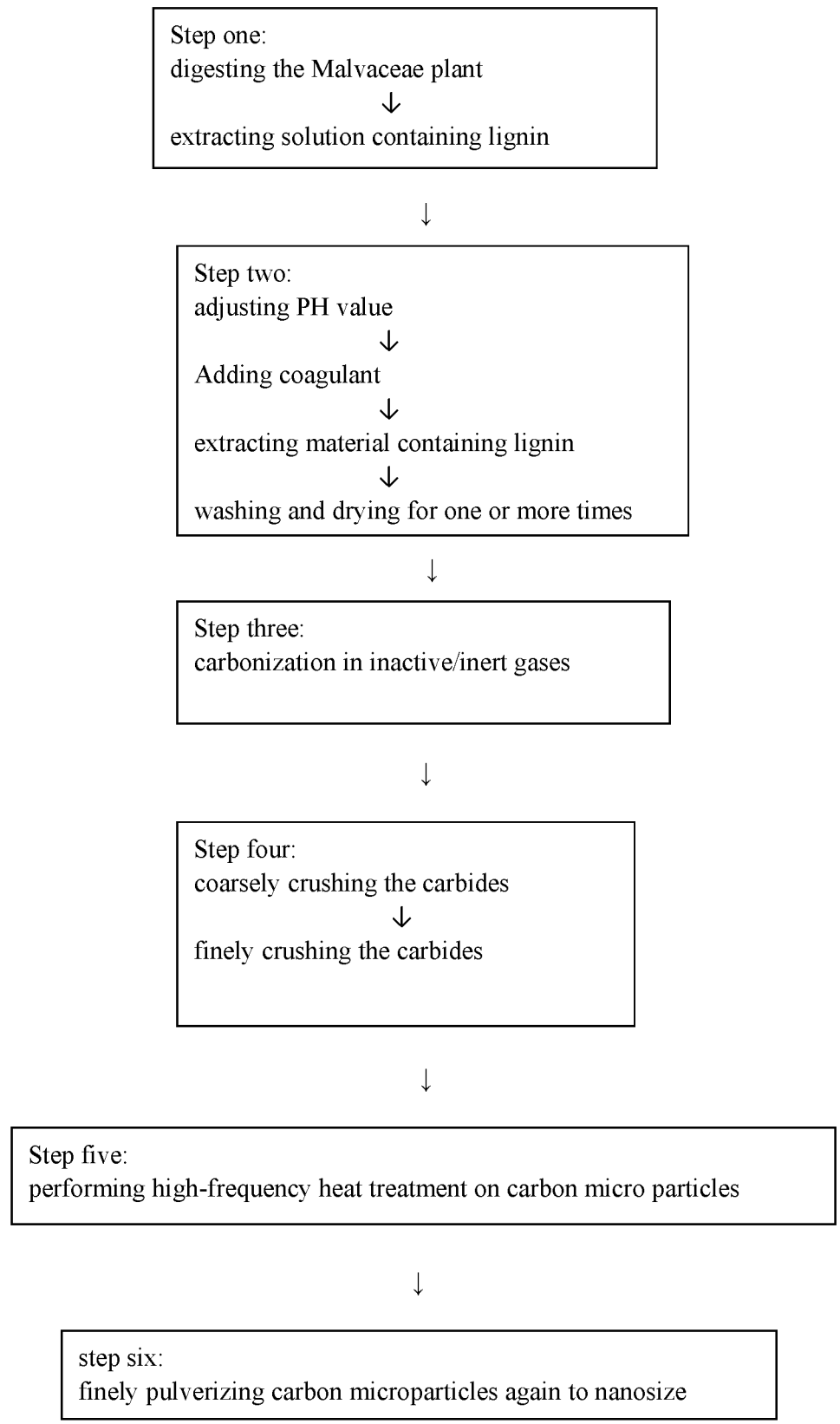

METHOD FOR MANUFACTURING NANO-CARBON MICROPARTICLE

CROSS REFERENCE TO RELATED APPLICATIONS

This application is the national phase entry of International Application PCT/CN2018/084495, filed on Apr. 25, 2018, which is based upon and claims priority to Chinese Patent Application No. 201810218716.7, filed on Mar. 16, 2018, the entire contents of which are incorporated herein by reference.

TECHNICAL FIELD

The present invention relates to the technical field of production of Nano-carbon micro-particles, and uses the Malvaceae plants as raw materials to produce carbon micro-particles through a specific processing and separation method, particularly relates to a method for manufacturing carbon micro-particles.

BACKGROUND

Malvaceae plant (scientific name: Malvaceae), the raw material of carbon micro-particles, belongs to the family of Malvales. According to the structure of flowers and fruits, the family is divided into Malva, Brahma, and Hibiscus, and there are about 50 genera, and about 1000 species, distributed in the tropic to temperate zone. There are 16 genera in China, including 81 species and 36 varieties or variants. They are produced all over the country, with many species in tropical and subtropical regions.

The Malvaceae plant is widely known for its many applications such as hemp rope, papermaking, and heat preservation. The requirement for the quality of the growing soil is not high. It only requires a good daylight and can be planted in large quantities. It is a plant resource that can be used in large quantities and is not used as food by animals.

Malvaceae plants are known for their high fiber content. For example, cotton is the most important raw material for the textile industry in the world. The bark fibers of the genus of Hibiscus, Brahma, *Abutilon*, and *Sida* are used for weaving or making ropes. For example, the hibiscus plant in the malva family is an annual herbaceous bast fiber crop, and any part thereof can be used as a raw material.

When hibiscus plants of the Malvaceae plants are used as non-wood pulp raw materials, lignin and black by-products are generated during the pulp manufacturing process. Generally, these black liquids are discarded as waste, but in the present invention, the lignin-containing black liquid is effectively recycled.

Chinese patent application, with the application number of CN 102910613A and publication date of Feb. 6, 2013, disclosed a method for preparing high-dispersion Nano-carbon particles, which is characterized by using the following steps: (1) Adding a solution containing 5-10 mmol of a cationic surfactant to a suspension containing 10 g of bentonite in a 60-65° C. water bath, so that the concentration of the surfactant solution is 1-4 mol/L, continuously stirring during the addition process, continuing to stir for 2 hours under the same conditions after completion of the dropwise addition, centrifugation, washing the solids with deionized water for 4-5 times, drying at 100-105° C., grinding to obtain powders of 50-80 mesh; (2) placing the powders in a tube furnace protected by $N_2$, carbonizing the powders at 500-800° C. for 4-6 h, and then cooling to room temperature by continuously filling with $N_2$; (3) putting 2-4 g of carbonized solid material into a bottle, adding 10-15 mL of hydrofluoric acid solution with a concentration of 20-40%, and stirring for 2-3 h, separating the solid and liquid, and then adding the separated solid to 10-15 mL hydrochloric acid solution with a concentration of 20-40%; (4) solid-liquid separation, washing with deionized water, drying at 60-70° C. for 5-6 hours, and obtaining Nano-carbon particles. The method uses a tube furnace which is protected by an inert gas to carbonize the powder, which has the disadvantage of forming small amount of carbon particles in a single formation, and different surfactants have limitations on the diameter of the formed carbon particles.

Chinese patent application, with the application number CN 107364842A and the publication date of Nov. 21, 2017, disclosed a method for preparing bio-carbon particles. It is characterized by the following steps: step one, cleaning water hyacinth; step two, air-drying water hyacinth; step three, drying water hyacinth; step four, crushing the dried water hyacinth, and screening; step five, preparing the sludge with a water content of 65%-75%; step six, mixing the sludge prepared in step five and the water hyacinth powder prepared in step four; step seven, preparing the mixture into granular sludge; step eight, pyrolytic reacting the sludge particles to obtain biochar particles; step nine, soaking the biochar particles with dilute hydrochloric acid; step ten, washing the biochar particles with deionized water to neutrality; step eleven, baking the biochar particles. In fact, this method is to use water hyacinth and sludge as raw materials to prepare larger biochar particles, but Nano-sized carbon particles cannot be prepared.

SUMMARY

The objective of the present invention is to solve the problem of producing high-purity lignin with Malvaceae plants as a raw material, and to use this as a method for manufacturing high-purity carbon micro-particles, which overcomes the deficiencies in the prior art.

The technical solution adopted by the present invention to solve the above problems is: a method for manufacturing the nano carbon micro particles, which includes:

step one: the Malvaceae plant to produce a solution containing lignin;

step two: extracting lignin condensation from the solution containing lignin, and then removing salt from the lignin condensation to form material containing lignin;

step three: carbonizing the material containing lignin to form carbides;

step four: crushing the carbides;

step five: performing high-frequency heat treatment on the crushed carbides to obtain carbon micro particles.

Preferably, the present invention also includes step six. In case, the requirement is to obtain the carbon micro particles finer in size as compared to the carbon particles obtained in step five, the carbon micro particles are crushed again in step six, so that the carbon micro particles are nano-sized and finely pulverized.

Preferably, in the step one, the Malvaceous plants are stirred and heated in an alkaline solution at 15-120° C. for 4-96 hours.

Preferably, the step two includes adding an acidic substance to the solution containing lignin to adjust the pH, and adding a coagulant to perform the lignin condensation, and then the extracted condensed lignin is subjected to manufacturing processes such as drying, washing, and re-drying.

Preferably, in the step three, for carbonization, the material containing lignin is required to be heated to 110 to 950° C. in an inactive or inert gas atmosphere.

Preferably, in the step four, the average particle size of the carbides is crushed to 5-50 um.

Preferably, in the step six, the carbon micro particles are crushed again in a medium such as a liquid or a gas.

Compared with the prior art, the present invention has the following beneficial effects. High-purity carbon micro particles obtained by the present invention have excellent performance in many aspects such as electrical conductivity, abrasion resistance, heat resistance, and corrosion resistance. It can be used as electromagnetic sealing material, wear-resistant material, heating element, heat-resistant material, and corrosion-resistant material. It is widely used in the synthetic lubricant with high chemical stability, carbon micro particles can disperse in high concentration, after dispersing, the carbon micro particles act as a lubricant additive, it is only necessary to add a very small amount of carbon micro particles to the existing engine lubricating oil, the lubrication effect on the engine can be obviously observed.

BRIEF DESCRIPTION OF THE DRAWINGS

In order to explain the embodiments of the present invention or the technical solutions in the prior art more clearly, the drawings used in the description of the embodiments or the prior art will be briefly described below. Obviously, the drawings in the following description are only some embodiments of the present invention. For those skilled in the art, other drawings may also be obtained based on these drawings without any creative work.

FIG. 1 is a process flow diagram of a method for producing nano carbon micro particles of the present invention.

DETAILED DESCRIPTION

The method for producing nano carbon micro particles includes the following steps: S1, digesting a Malvaceae plant to produce a solution containing lignin; S2, extracting a lignin condensation from a solution containing lignin, and then removing salt in the lignin condensation to form a material containing lignin; S3, carbonizing the material containing lignin to form a carbide; S4, crushing the carbide; S5, performing a high-frequency heat treatment on the crushed carbide to obtain carbon micro particles; S6, If the size of the carbon micro particles is required to be even finer, crushing again the obtained carbon micro particles, so that the carbon micro particles are nano-sized and finely pulverized.

Malvaceae plants, the raw materials used in the present invention, can be selected from freshly harvested plants or dried plants, and there is no limitation on the size, so long as they can be placed in a working tank and fully digested, if necessary, before putting into the tank, it can be cut into a small size.

In the method for producing carbon micro particles of the present invention, step S1 includes processes of digesting a Malvaceae plant and obtaining a solution containing lignin. The digestation tank used in the digesting process is made of metal material, and separation and filtration of solid Malvaceous plants from the solution used for digesting is performed by reticulation, and when digesting, the material to be digested is soaked and stirred.

In the digestion process, raw materials of Malvaceae plants are put into the inner tank, so that the raw materials can sink into the liquid composed of the solution and the agentia, and then heated to a certain temperature for stirring, so that the raw materials are slowly digested, and two kinds of materials can be obtained after the completion of the digestion. One is the digested Malvaceous plant material, the other is the black liquid containing lignin produced after the digestion. Among them, agentia used for digestion can be the solid or liquid dissolving substances that can be dissolved in water. The concentration of the agentia used is appropriately adjusted according to the type of the agentia. Generally, the concentration is controlled to 2-50%. If the concentration is lower than 2%, which is excessive low, the efficiency will be relatively low, while the concentration higher than 50% will lead to heavy workload of the follow-up modulation and cleaning, and too many impurities, resulting in the waste of cost of subsequent processes. For example, the amount of nitric acid solution needs to be properly adjusted according to the type of the agentia. If the concentration is too low, the efficiency will be relatively low, and if the concentration is too high, the workload of modulation and cleaning of the follow-up project will increase, resulting in a waste of cost of the subsequent process.

The recycled black liquid continues to be used as a digesting solution, and then the digestion process is repeated. The digestion process is repeated one or more times. The number of times of specific reuse depend on when the black liquid is relatively saturated, and the supersaturation of the solution will affect the digestion efficiency. When the solution is too saturated, it is necessary to replace the solution and agentia again, and then repeat the digestion process.

The digestion step is required to be performed at a temperature of 15-180° C. for more than one hour. The digestion temperature less than 15° C. and the digestion time less than 1 hour will lead to poor digestion effect of the material containing lignin. At the same time, if the digestion temperature exceeds 180° C. and the digestion time is too long, the digestion efficiency will decrease.

After the raw materials of the Malvaceae plants are digested by the above method, a solid substance mainly composed of cellulose and a black liquid mainly composed of lignin are separated. The present invention uses the black liquid mainly composed of lignin to produce carbon micro particles, and the solid substance mainly composed of cellulose can be used for other purposes, such as making fibers.

In the method for producing carbon micro particles of the present invention, step S2 includes processes such as adding an acid for adjusting the pH, adding a coagulant, extracting a substance containing lignin, drying, washing with water, and re-drying, etc.

Water and sulfuric acid are added to the black liquid to obtain a mixed solution, the mixed solution is stirred and the pH of the mixed solution is observed until the pH value is below 6, and then the coagulant is added to collect the lignin condensation and the moisture in the lignin condensation is filtered, and then the filtered lignin condensation is dried. After the material containing lignin is dried, the salts in the step S1 will be precipitated. At this time, the condensed lignin is washed with water to remove salt, and then the washed lignin is dried to form material containing lignin. The drying method may be air drying or natural drying. The material containing lignin after salt separation is subjected to the next purification treatment, and after drying, the reaction efficiency in the subsequent carbonization step is improved. The coagulant used herein may be a polymer coagulant or an inorganic coagulant.

In the method for producing carbon micro particles of the present invention, step S3 includes a carbonization step of the salt-removed material containing lignin, the carbonization step is performed in a carbonization furnace, and the carbonization furnace is a rotary high-temperature firing furnace. During carbonization, the dried material containing lignin without salt is placed in a rotary high-temperature firing furnace (incombustible container) and carbonized at 110-950° C. to remove organic matter. The purity of the carbon micro particles is finally increased to form carbides. During the purification process, inert gas must be injected. The temperature of carbonization is controlled at 180-900° C., and the time is controlled for more than one hour. This ensures that the carbonization is sufficient. Organic ingredients that are removed includes lipids, proteins, sugar, etc.

In the method for producing carbon micro particles of the present invention, step S4 is a pulverization step for the carbides, which includes rough processing of carbide pulverization, that is, coarse pulverization treatment step, and finish processing of carbide pulverization, that is, fine pulverization step. After the carbide coarse pulverization treatment step is performed, the average particle size is 0.02-1 mm, and the coarse pulverization equipment can be selected from a drum type pulverizer, an impact pulverizer, or a knife cutter type pulverizer. The coarsely pulverized product is subjected to further fine pulverization processing so that the average particle size reaches 10-40 μm. The pulverizer in the fine pulverization process can be a high pressure air turbine pulverizer so that the particles collide with each other to achieve the purpose of pulverization. This kind of pulverizer does not need to add other kinds of media, ensuring the purity of the material.

In the method for producing carbon micro particles of the present invention, an ion heating device is used in step S5, a plasma gas is filled into a cavity of the ion heating device, and plasma is generated after the ion heating device is powered on; the pulverized carbide is introduced into the cavity first and then heated to 2000° C.-10000° C. through electric discharge, so that the carbide is sublimated after heating, and then solidified after cooling, thereby obtaining carbon micro particles. Since the material containing lignin in step S3 may not be sufficiently carbonized, the carbides pulverized in step S5 are subjected to plasma heat treatment, the material containing lignin that is not sufficiently carbonized can be sufficiently carbonized. Therefore, carbon micro particles with higher carbonization degree can be obtained.

In the present invention, if carbon micro particles with fine sizes are required, the carbon micro particles generated in step S5 are crushed again in step S6 so that the carbon micro particles are nano-sized and finely pulverized. Preferably, the extracted carbon micro particles are crushed again in the pulverizer, so that the average particle diameter reaches 5-500 nm or even finer 5-400 nm. Through this process, the carbon micro particles are sufficiently crushed to the nanometer size, and as a result, the generated nano-sized carbon micro particles can be smoothly and stably dispersed and the effect of co-fusion and diffusion with the liquid in the fine gaps of the liquid molecules is achieved. In order to crush the carbon micro particles to the nanoparticles, the pulverizer needs to have a capability of crushing the carbon micro particles to a size of 5-500 nm. Preferably, the pulverizer can select a planetary gear driven pulverizer.

In addition, the re-pulverizing step may be performed in a state when the carbon micro particles are dispersed in the liquid or may be performed in a vacuum or in a gaseous atmosphere.

Analytically speaking, the carbon micro particles extracted by the present invention are composed of amorphous (amorphous) carbon, and the structures of the carbon micro particles can be confirmed by analyzing with an electron microscope or a Raman spectrometer.

To make the objectives, technical solutions, and advantages of the embodiments of the present invention clearer, the technical solutions of the present invention will be described clearly and completely with reference to the accompanying drawings. Obviously, the described embodiments are parts of the embodiments of the present invention, not all of the embodiments. All other embodiments obtained by a person of ordinary skill in the art based on the embodiments of the present invention without creative efforts shall fall within the protection scope of the present invention.

Embodiment 1

The carbon micro particles are extracted from the raw materials of Malvaceae plants by the following series of steps.

S1: The Malvaceous plant is digested with an agentia to produce a solution containing lignin.

Digestion tank uses heat-resistant steel, including carbon steel or stainless steel, isolation and filtration of Malvaceous Plants from the solution used for digestion are performed by reticulation, digestion tank is also equipped with stirring components.

About 100 kg solution with digestion agentia is injected into the digestion tank, and less than 50 kg Malvaceae plant raw material is added. The Malvaceae plant raw material is cut into small pieces and soaked into the solution, and the digestion tank is heated to a temperature between 20° C. and 30° C., and continuously stirred for more than one hour, the Malvaceae plants in the inner tank are taken out, and packed separately, and re-incorporated into less than 50 kg new Malvaceae plant raw materials, and then cut into small pieces and put into the digestion tank. The digestion treatment was performed at a temperature 5° C. higher than the previous digestion temperature, which can stop until the resulting solution becomes black.

S2: A lignin condensation is extracted from the solution containing lignin, and then the salt in the lignin condensation is removed.

The black solution containing lignin (abbreviated as "black liquor") is stirred, and then the acidic solvent is added until the pH value drops below six. Then an appropriate amount of coagulant is added. The amount of coagulant is not limited, and it is needed that agglutinated solid substances can be generated on the surface of the black liquor and these aggregated solid substances are easily collected, and then the collected lignin condensation are placed in a container to squeeze out the water, and then the lignin condensation without water were compressed into a block to dry for a few days, and the dried lignin condensation were washed with water and dried again.

S3: Carbonization process of the material containing lignin after salt removal.

The dried solid material containing lignin was placed in a metal vessel and then placed in a carbonization furnace. An inert gas was supplied to the carbonization furnace, the dried solid material containing lignin was heated to 180° C. to remove the organic components. Then, the carbonization furnace was cooled, the air supply was stopped, and then the carbide was taken out.

S4: Crushing step of carbide.

The resulting carbonized solid material was put into a pulverizer for coarse pulverization to obtain coarsely pulverized carbide particles with an average diameter of less than 1 mm, then placed in a nano-pulverizer and further pulverized until the average diameter was less than 40 μm.

S5: performing heat treatment on the pulverized carbide to obtain carbon micro particles.

An inert gas is introduced into the cavity of the high-frequency heating device to generate plasma, and then the pulverized carbide is introduced into the cavity of the high-frequency heating device and heated to 2000° C. by electric discharge, so that the carbon micro particles are thermally decomposed, and then cooled and solidified to obtain carbon micro particles.

S6: Re-pulverizing the obtained carbon micro particles and subjecting the carbon micro particles to nano fine pulverization.

The high-frequency-heat-treated carbon micro particles are thrown into a nano-pulverizer for nano-micro-pulverization processing, and carbon micro particles can also be melted in a liquid medium and then thrown into a nano-pulverizer for nano-micro-pulverization processing.

The structures of the carbon micro particles finally obtained were confirmed by electron microscopy or Raman spectroscopy, and the average diameter was between 20 and 500 nm.

Embodiment 2

The carbon micro particles are extracted from the raw materials of Malvaceae plants by the following series of steps.

S1: The malvaceous plant is digested with an agentia to produce a solution containing lignin.

Digestion tank uses heat-resistant steel, including carbon steel or stainless steel, isolation and filtration of Malvaceous Plants from the solution used for digestion are performed by reticulation, digestion tank is also equipped with stirring components.

About 100 kg solution with digestion agentia is injected into the digestion tank, and less than 50 kg Malvaceae plant raw material is added. The Malvaceae plant raw material is cut into small pieces and soaked into the solution, the digestion tank is heated to a temperature between 150° C. and 160° C., and continuously stirred for more than one hour, the Malvaceae plants in the inner tank are taken out, and packed separately, and re-incorporated into less than 50 kg new Malvaceae plant raw materials, and then cut into small pieces and put into the digestion tank. The digestion treatment was performed at a temperature 5° C. higher than the previous digestion temperature, which can stop until the resulting solution becomes black.

S2: A lignin condensation is extracted from the solution containing lignin, and then the salt in the lignin condensation is removed.

The black solution containing lignin (abbreviated as "black liquor") is stirred, and then the acidic solvent is added until the pH value drops below six. Then an appropriate amount of coagulant is added. The amount of coagulant is not limited, and what is needed is that agglutinated solid substances can be generated on the surface of the black liquor and these aggregated solid substances are easily collected, and then the collected condensed lignin is placed in a container to squeeze out the water, and then the condensed lignin without water was compressed into a block to dry for a few days, and the dried condensed lignin was washed with water and dried again.

S3: Carbonization process of the material containing lignin after salt removal.

The dried solid material containing lignin was placed in a metal vessel and then placed in a carbonization furnace. An inert gas was supplied to the carbonization furnace, the dried solid material containing lignin was heated to 900° C. to remove the organic components therein. Then, the carbonization furnace is cooled, the air supply is stopped, and then the carbide is taken out.

S4: Crushing process of carbide.

The resulting carbonized solid material was put into a pulverizer for coarse pulverization to obtain coarsely pulverized carbide particles with an average diameter of less than 1 mm, then placed in a nano-pulverizer and further pulverized until the average diameter was less than 40 μm.

S5: performing heat treatment on the pulverized carbide to obtain carbon micro particles.

An inert gas is introduced into the chamber of the high-frequency heating device to generate plasma, and then the pulverized carbide is introduced into the cavity of the high-frequency heating device and heated to 10000° C. by electric discharge, so that the carbon micro particles are thermally decomposed, and then cooled and solidified to obtain carbon micro particles.

S6: Re-pulverizing the obtained carbon micro particles and subjecting the carbon micro particles to nano fine pulverization.

The high-frequency-heat-treated carbon micro particles are thrown into a nano-pulverizer for nano-micro-pulverization processing, and carbon micro particles can also be melted in a liquid medium and then thrown into a nano-pulverizer for nano-micro-pulverization processing.

The structures of the carbon micro particles finally obtained was confirmed by electron microscopy or Raman spectroscopy, and the average diameter thereof was between 5 and 400 nm.

It should be noted that the detailed description of the technical solutions of the present invention with reference to the preferred embodiments is schematic and not restrictive. Persons of ordinary skills in the art can modify the technical solutions described in the embodiments on the basis of reading the description of the present invention or perform equivalent replacement of some of the technical features, and these modifications or replacements do not make the nature of the corresponding technical solutions depart from the scope of the technical solutions of the embodiments of the present invention.

We claim:

1. A method for manufacturing nanocarbon microparticles, comprising:
   (1) stirring and heating a Malvaceae plant in an alkaline solution at a temperature of 15-180° C. for more than one hour, and then digesting the Malvaceous plant to produce a solution containing lignin;
   (2) adding an acidic substance to the solution containing lignin to adjust pH, and adding a coagulant to extract a lignin agglomerate from the solution containing lignin to obtain an extracted lignin agglomerate, and then washing and drying the extracted lignin agglomerate for one or more times to remove salt to form a material containing lignin;
   (3) carbonizing the material containing lignin to form carbides;
   (4) crushing the carbides by a rough crushing treatment followed by a fine pulverization, wherein the fine pulverization is conducted with a high-pressure air turbine pulverizer so that particles collide with each other to achieve the fine pulverization to obtain crushed carbides whose average particle size is 10-40 μm, and;

(5) filling a plasma gas into a cavity of an ion heating device, generating plasma by powering on the ion heating device, introducing the crushed carbides into the cavity, and performing high-frequency heat treatment by heating the crushed carbides to 2000° C.-10000° C. through electric discharge so that the crushed carbides are sublimated after heating and then solidified after cooling to obtain carbon microparticles.

2. The method for manufacturing nanocarbon microparticles according to claim 1, further comprising pulverizing the carbon microparticles so that the carbon microparticles are nano-sized and finely pulverized.

3. The method for manufacturing nanocarbon microparticles according to claim 1, wherein the carbonizing is conducted by heating the material containing lignin to 110-950° C. in an inactive or inert gas atmosphere.

4. The method for manufacturing nanocarbon microparticles according to claim 2, wherein the carbon microparticles are pulverized in a liquid environment, a gas environment, or a vacuum environment.

* * * * *